US012700678B2

(12) United States Patent
Kim et al.

(10) Patent No.: US 12,700,678 B2
(45) Date of Patent: Aug. 4, 2026

(54) ELECTRONIC DEVICE INCLUDING ANTENNA

(71) Applicant: Samsung Electronics Co., Ltd., Suwon-si (KR)

(72) Inventors: Jiho Kim, Suwon-si (KR); Sumin Yun, Suwon-si (KR); Hyeonuk Kang, Suwon-si (KR); Kyungmoon Seol, Suwon-si (KR); Seongyong An, Suwon-si (KR); Kyihyun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/323,738

(22) PCT Filed: Nov. 29, 2021

(86) PCT No.: PCT/KR2021/017770
§ 371 (c)(1),
(2) Date: Oct. 14, 2025

(87) PCT Pub. No.: WO2022/114896
PCT Pub. Date: Jun. 2, 2022

(65) Prior Publication Data

US 2024/0113441 A1 Apr. 4, 2024

(30) Foreign Application Priority Data

Nov. 30, 2020 (KR) ........................ 10-2020-0165013

(51) Int. Cl.
*H01Q 13/10* (2006.01)
*H01Q 1/24* (2006.01)

(52) U.S. Cl.
CPC ............. *H01Q 13/10* (2013.01); *H01Q 1/243* (2013.01)

(58) Field of Classification Search
CPC .......... H01Q 13/10; H01Q 1/243; H01Q 1/24; H01Q 1/38; H01Q 13/18
See application file for complete search history.

(56) References Cited

U.S. PATENT DOCUMENTS 5,138,329 A * 8/1992 Saarnimo ............... H01Q 1/244 343/893
5,360,353 A * 11/1994 Kinoshita ............ H01R 13/719 439/71

(Continued)

FOREIGN PATENT DOCUMENTS

CN 111243440 A 6/2020
KR 10-0550780 B1 2/2006

(Continued)

OTHER PUBLICATIONS

International Search Report dated Mar. 7, 2022, issued in an International Application No. PCT/KR2021/017770.

(Continued)

*Primary Examiner* — Dameon E Levi
*Assistant Examiner* — Jordan E. DeWitt
(74) *Attorney, Agent, or Firm* — Jefferson IP Law, LLP

(57) ABSTRACT

An electronic device including an antenna is provided. The electronic device includes a housing and a sliding plate, wherein: the housing comprises an antenna circuit unit arranged on a side surface corresponding to the sliding operation direction of the sliding plate, and a contact unit for electrically connecting the housing and the sliding plate, wherein the antenna circuit unit further includes, as a radiator, at least one frame arranged on the side surface, wherein the housing and the plate form a space, and wherein the space, the contact unit, and the antenna circuit unit can form a cavity antenna.

16 Claims, 15 Drawing Sheets

(56) References Cited

U.S. PATENT DOCUMENTS

| | | | | |
|---|---|---|---|---|
| 5,779,496 | A * | 7/1998 | Bolinger | G06F 1/1632 439/492 |
| 6,172,645 | B1 * | 1/2001 | Hollander | H01Q 1/2275 343/702 |
| 6,208,874 | B1 * | 3/2001 | Rudisill | H04M 1/0237 455/575.4 |
| 6,259,409 | B1 * | 7/2001 | Fulton | H01Q 1/244 343/702 |
| 6,266,017 | B1 * | 7/2001 | Aldous | H01R 13/639 343/702 |
| 6,429,817 | B1 * | 8/2002 | Creigh | H01Q 1/087 343/702 |
| 6,618,013 | B1 * | 9/2003 | Aldous | H01Q 1/244 343/702 |
| 6,639,563 | B1 * | 10/2003 | Gu | H01Q 1/103 343/702 |
| 7,509,143 | B2 * | 3/2009 | Lintern | H01Q 1/2275 343/702 |
| 10,243,624 | B2 | 3/2019 | Kim et al. | |
| 10,972,592 | B2 | 4/2021 | Song et al. | |
| 2005/0007747 | A1 * | 1/2005 | Axelrod | H05K 5/04 361/752 |
| 2006/0001581 | A1 * | 1/2006 | Lee | H04M 1/0235 343/702 |
| 2006/0097931 | A1 * | 5/2006 | Kim | H01Q 1/243 343/702 |
| 2006/0099837 | A1 * | 5/2006 | Cheng | H05K 5/10 439/131 |
| 2006/0132366 | A1 * | 6/2006 | Seol | H01Q 21/28 343/702 |
| 2007/0126644 | A1 * | 6/2007 | Kim | H01Q 19/00 343/702 |
| 2009/0143119 | A1 * | 6/2009 | De Vos | H01Q 1/2258 455/575.7 |
| 2010/0103054 | A1 * | 4/2010 | Shi | H01Q 1/243 343/702 |
| 2010/0307787 | A1 * | 12/2010 | Ohmori | H01Q 1/243 174/51 |
| 2017/0196103 | A1 | 7/2017 | Cho et al. | |
| 2017/0364119 | A1 | 12/2017 | Lee et al. | |
| 2019/0261519 | A1 | 8/2019 | Park et al. | |
| 2020/0119429 | A1 | 4/2020 | Park et al. | |
| 2020/0170128 | A1 * | 5/2020 | Kim | G06F 1/1679 |
| 2020/0194879 | A1 | 6/2020 | Lim et al. | |
| 2020/0267247 | A1 | 8/2020 | Song et al. | |
| 2020/0287298 | A1 * | 9/2020 | Ueda | H01Q 9/0407 |
| 2020/0336577 | A1 * | 10/2020 | Han | G09F 9/301 |
| 2021/0213831 | A1 * | 7/2021 | Kang | B60K 35/29 |
| 2021/0219437 | A1 | 7/2021 | Kim et al. | |
| 2021/0377372 | A1 | 12/2021 | Jung et al. | |
| 2022/0148464 | A1 * | 5/2022 | Kwak | G06F 1/1643 |
| 2024/0113441 | A1 * | 4/2024 | Kim | H01Q 13/18 |
| 2024/0223051 | A1 * | 7/2024 | Griesbach | H01R 43/14 |
| 2024/0364006 | A1 * | 10/2024 | Thai | H01Q 21/065 |
| 2025/0023225 | A1 * | 1/2025 | Kim | H01Q 9/04 |

FOREIGN PATENT DOCUMENTS

| | | | |
|---|---|---|---|
| KR | 10-2017-0056246 | A | 5/2017 |
| KR | 10-2017-0141438 | A | 12/2017 |
| KR | 10-2019-0101184 | A | 8/2019 |
| KR | 10-2019-0143029 | A | 12/2019 |
| KR | 10-2020-0042611 | A | 4/2020 |
| KR | 10-2020-0046399 | A | 5/2020 |
| KR | 10-2020-0073745 | A | 6/2020 |
| KR | 10-2020-0099455 | A | 8/2020 |
| KR | 10-2020-0117741 | A | 10/2020 |

OTHER PUBLICATIONS

Korean Office Action dated Jan. 2, 2025, issued in a Korean Patent Application No. 10-2020-0165013.

* cited by examiner

ELECTRONIC DEVICE INCLUDING ANTENNA

CROSS-REFERENCE TO RELATED APPLICATION(S)

This application is a U.S. National Stage application under 35 U.S.C. § 371of an International application No. PCT/KR2021/017770, filed on Nov. 29, 2021, which is based on and claims the benefit of a Korean patent application number 10-2020-0165013, filed on Nov. 30, 2020, in the Korean Intellectual Property Office, the disclosure of which is incorporated by reference herein in its entirety.

BACKGROUND

1. Field

The disclosure relates to an electronic device including an antenna.

2. Description of Related Art

With the development of digital technology, electronic devices may be provided in various forms, such as a smartphone, a laptop, or a tablet personal computer (PC). Electronic devices are being designed to provide a larger screen while having a portable size that does not cause inconvenience to users when handling the electronic devices by hand.

An electronic device may be implemented to be capable of expanding a screen, for example, in a slide manner. For example, a portion of a flexible display may be pulled out from the inner space of the electronic device in a slide manner, whereby the screen is expandable.

The above information is presented as background information only to assist with an understanding of the disclosure. No determination has been made, and no assertion is made, as to whether any of the above might be applicable as prior art with regard to the disclosure.

SUMMARY

A slide-type electronic device may lack a space for arranging components including an antenna due to a configuration for sliding. As another example, in a slide-type electronic device, it may be difficult to ensure radiation performance of an antenna due to a sliding portion.

Aspects of the disclosure are to address at least the above-mentioned problems and/or disadvantages and to provide at least the advantages described below. Accordingly, an aspect of the disclosure is to provide an electronic device including a flexible display, wherein the electronic device further includes a cavity antenna configured to use an empty space in a housing thereof as an antenna in a state in which the display is expanded.

Additional aspects will be set forth in part in the description which follows and, in part, will be apparent from the description, or may be learned by practice of the presented embodiments.

In accordance with an aspect of the disclosure, an electronic device which includes an antenna is provided. The electronic device includes a housing, and a sliding plate, wherein the housing includes an antenna circuit disposed on a side surface of the sliding plate corresponding to a sliding direction, and a contact electrically interconnecting the housing and the sliding plate, wherein the antenna circuit further includes at least one frame disposed on the side surface as a radiator, and wherein the housing and the plate may define a space, and the space, the contact, and the antenna circuit may configure a cavity antenna.

An electronic device including an antenna according to various embodiments of the disclosure is able to improve antenna performance by using an empty space of a housing even when a display module is expanded.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
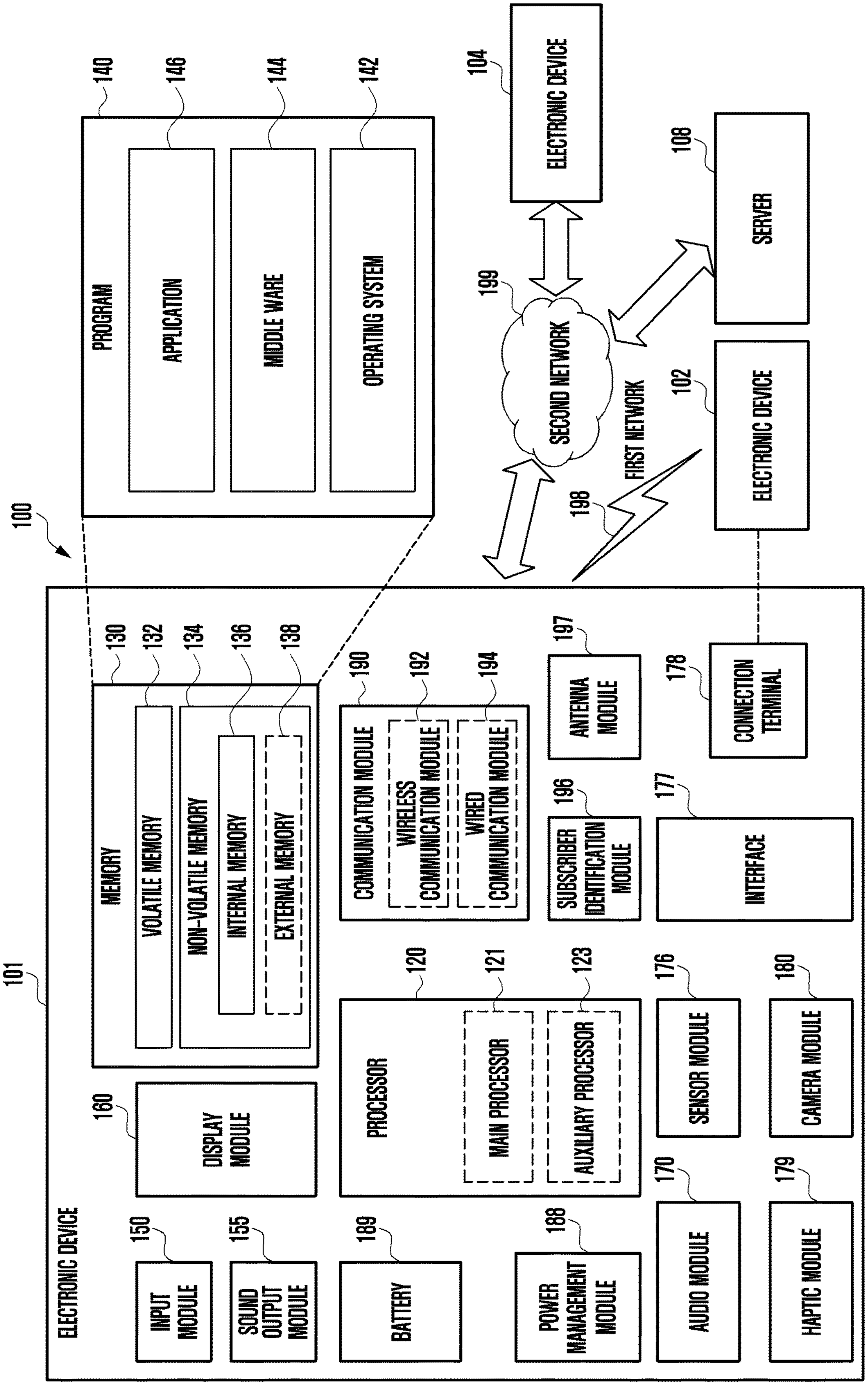
FIG. 1 is a block diagram of an electronic device configured to receive wireless power in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more)

for implementing eMBB, loss coverage (e.g., 164 decibels (dB) or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
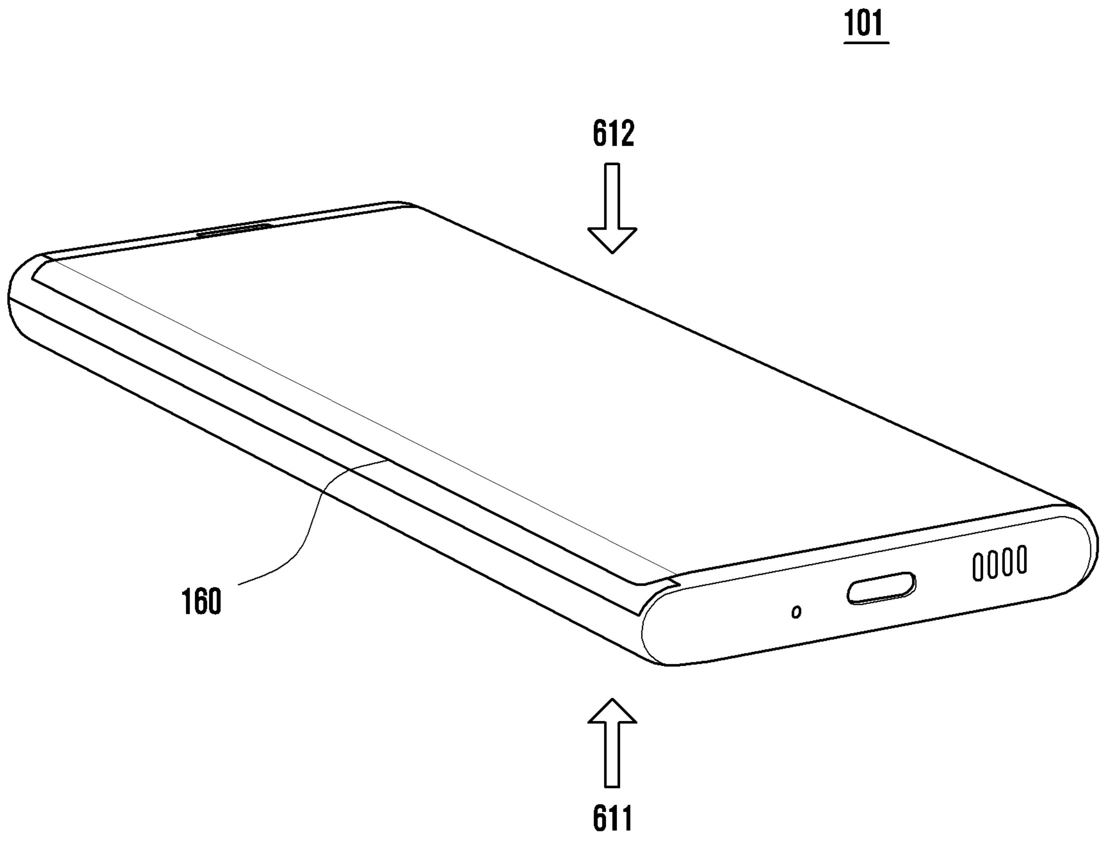
FIG. 2A is a perspective view illustrating an electronic device in a closed state according to an embodiment of the disclosure.

FIG. 2A is a perspective view illustrating an electronic device in a closed state according to an embodiment of the disclosure.

Figure 2B:
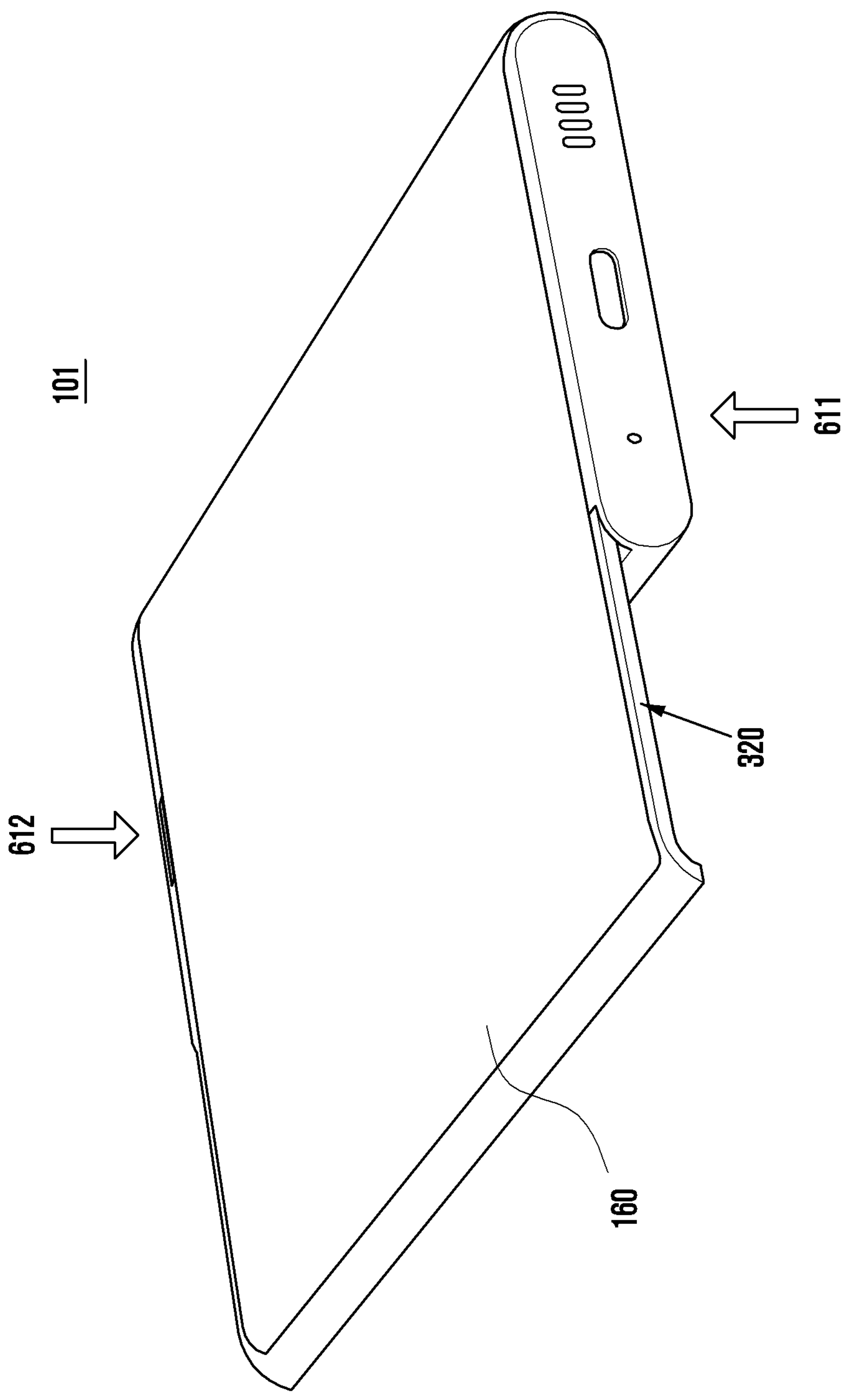
FIG. 2B is a perspective view of an electronic device in an open state according to an embodiment of the disclosure.

FIG. 2B is a perspective view of an electronic device in an open state according to an embodiment of the disclosure.

According to various embodiments of the disclosure, the electronic device 200 of FIGS. 2A and 2B may include the electronic device 101 of FIG. 1.

Referring to FIGS. 2A and 2B, in an embodiment of the disclosure, the electronic device 101 may be implemented to expand a screen in a sliding manner. For example, the screen may be an externally visible area of a display module 160 (e.g., a flexible display). FIG. 2A illustrates the electronic device 101 in a state in which the screen is not expanded, and FIG. 2B illustrates the electronic device 101 in a state in which the screen is expanded. The state in which the screen is not expanded is a state in which a sliding plate 320 for the sliding motion of the display module 160 is not slid out, and may be referred to as a "closed state" below. For example, the state in which the screen is expanded is a maximally expanded state in which the screen is not expanded any more due to the slide-out of the sliding plate 320, which may be referred to as an "open state" below.

In various embodiments of the disclosure, the electronic device 101 may include a camera module 180 facing a direction in which a rear surface 611 is oriented, and the electronic device 101 may include the display module 160 in at least a portion of a front surface 612.

According to various embodiments of the disclosure, the open state may be defined as a state in which the screen is expanded compared to the closed state, and the screens of various sizes may be provided depending on the moving position of the sliding plate 320.

According to various embodiments of the disclosure, an intermediate state may refer to a state between the closed state of FIG. 2A and the open state of FIG. 2B, and screens of various sizes may be provided depending on the moving position of the sliding plate 320.

The screen may include an active area of the display module 160 that is visually exposed to be capable of outputting an image, and the electronic device 101 is capable of adjusting the active area depending on the movement of the sliding plate 320 or the movement of the display module 160.

In some embodiments of the disclosure, the display module 160, which is disposed to be slidable in the electronic device 101 of FIG. 2A to provide a screen, may be referred to as a slide-out display, a flexible display, and/or an expandable display.

According to an embodiment of the disclosure, the electronic device 101 may include a sliding structure associated with the display module 160. For example, when moving by a configured distance by an external force, due to the elastic structure included in the sliding structure, the display module 160 may be switched from the closed state to the open state or from the open state to a closed state without any further external force (e.g., a semi-automatic slide operation).

According to some embodiments of the disclosure, when a signal is generated via an input device included in the electronic device 101, the electronic device 101 may be switched from the closed state to the open state or from the open state to the closed state due to a driving device, such as a motor, connected to the display module 160. For example, when a signal is generated via a hardware button or a software button provided via the screen, the electronic device 101 may be switched from the closed state to the open state or from the open state to the closed state.

According to various embodiments of the disclosure, when a signal is generated from various sensors, such as a pressure sensor, the electronic device 101 may be switched from the closed state to the open state or from the open state to the closed state. For example, when carrying or holding the electronic device 101 by hand, a squeeze gesture in which a portion of the hand (e.g., the palm or fingers) presses the electronic device 101 within a predetermined section may be detected by a sensor, and in response thereto, the electronic device 101 may be switched from the closed state to the open state or from the open state to the closed state.

For example, the display module 160 may include a flexible substrate (e.g., a plastic substrate) made of a polymer material including polyimide (PI) or polyester (PET).

According to an embodiment of the disclosure, the sliding plate 320 may be slidable on a support member (not illustrated) located inside the electronic device 101. At least a portion of the display module 160 may be disposed on the sliding plate 320, and the closed state of FIG. 2A or the open state of FIG. 2B may be provided based on the position of the sliding plate 320 on the support member. According to an embodiment of the disclosure, the display module 160 may be bonded to the sliding plate 320 via an adhesive member (or gluing member) (not illustrated) or a fixing member (not illustrated). According to an embodiment of the disclosure, the adhesive member may include a thermally reactive adhesive member, a photoreactive adhesive member, an ordinary adhesive, and/or a double-sided tape. As another example, the fixing member may include a screw, clip, or fixing structure. According to some embodiments of the disclosure, the display module 160 may be inserted into a recess provided in the sliding plate 320 and/or the housing in a sliding manner to be disposed on and/or fixed to the sliding plate 320. The sliding plate 320 serves to support at least a portion of the display module 160 and may be referred to as a display support structure in some embodiments.

According to an embodiment of the disclosure, the display module 160 may further include a touch detection circuit (e.g., a touch sensor). According to various embodiments of the disclosure, the display module 160 may be coupled to or disposed adjacent to a pressure sensor capable of measuring the intensity (pressure) of a touch, and/or a digitizer configured to detect a magnetic field-type pen input device (e.g., a stylus pen). For example, the digitizer may include a coil member disposed on a dielectric substrate to detect a resonance frequency of an electromagnetic induction scheme applied from a pen input device.

Figure 3:
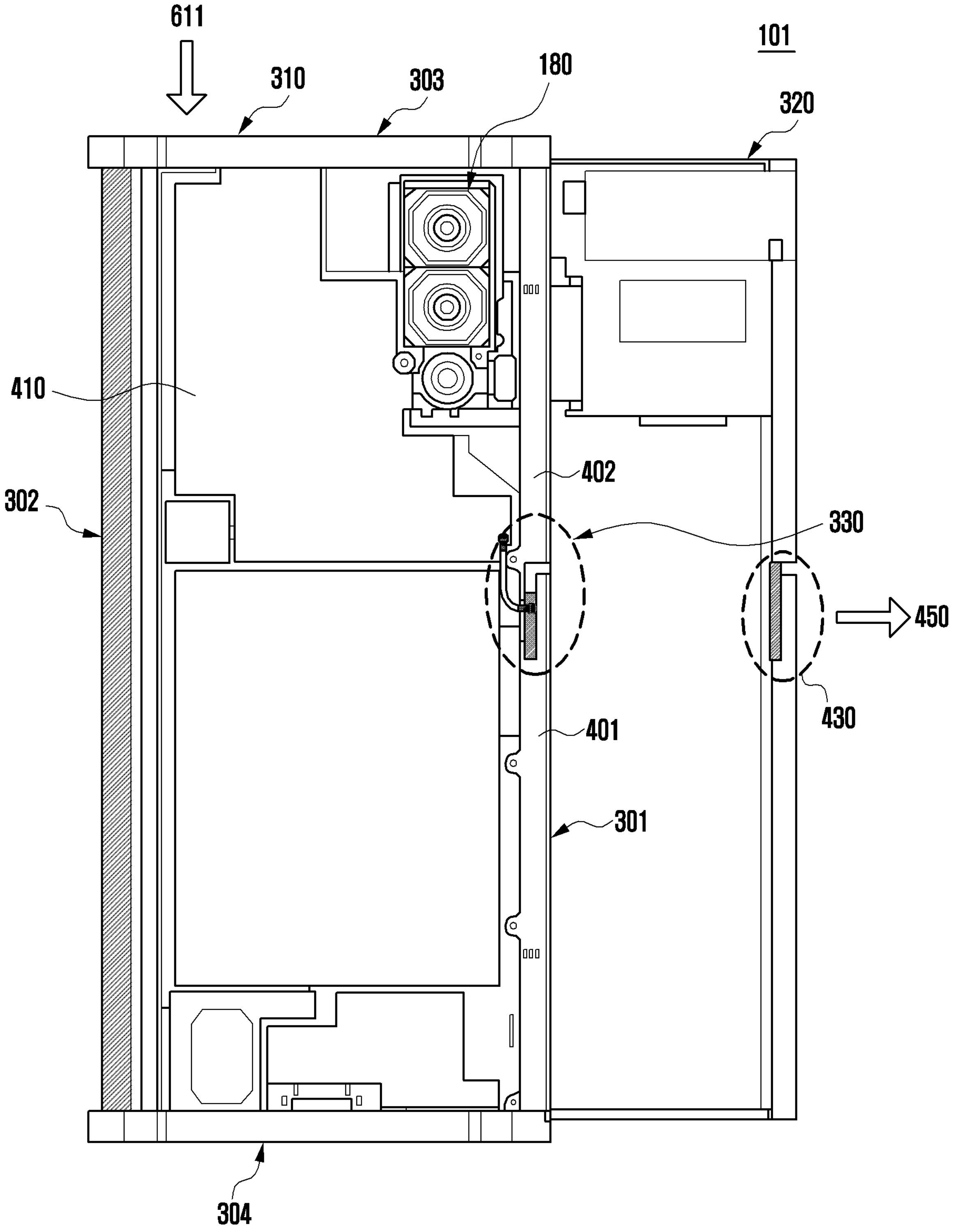
FIG. 3 is a rear view of an electronic device in a slide-out state according to an embodiment of the disclosure.

FIG. 3 is a rear view of an electronic device in a slide-out state according to an embodiment of the disclosure.

Figure 4:
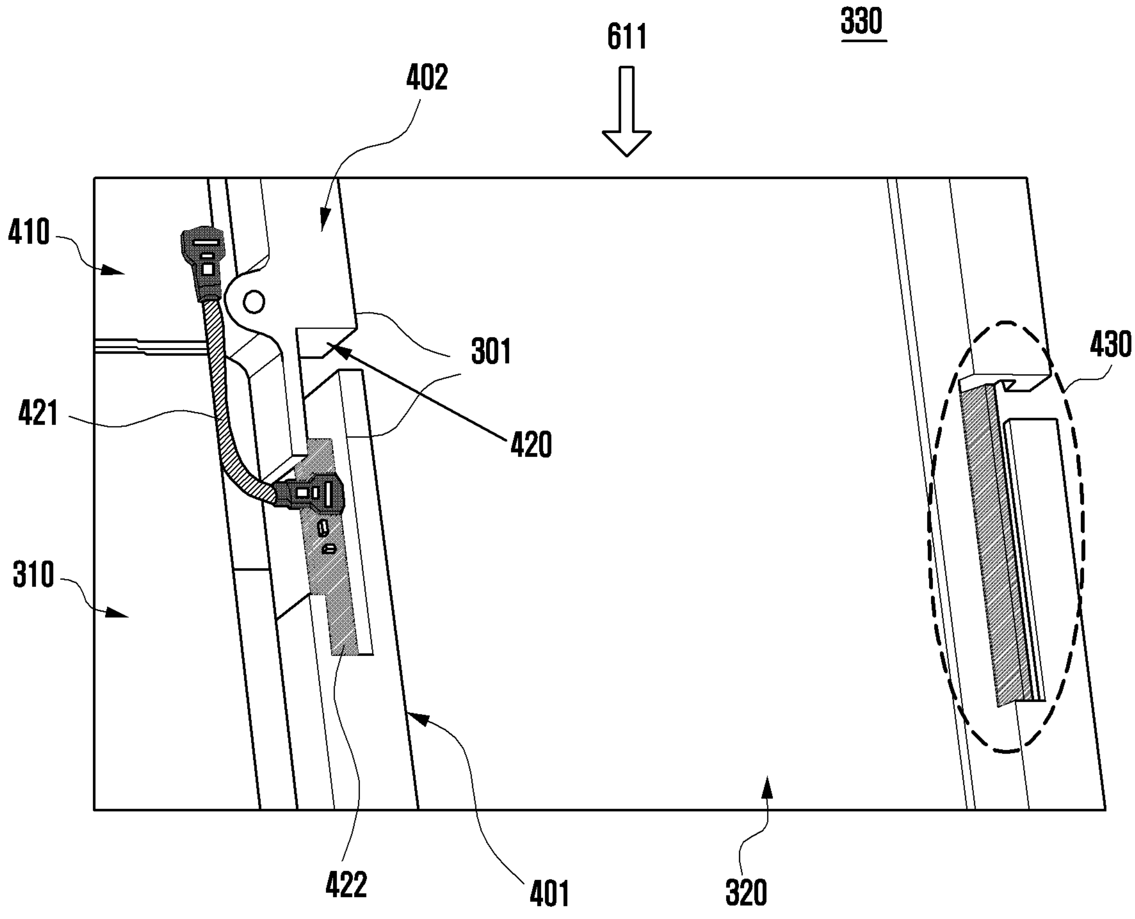
FIG. 4 is a view specifically illustrating an antenna circuit according to an embodiment of the disclosure.

FIG. 4 is a view illustrating an antenna circuit according to an embodiment of the disclosure.

To describe the circuit layout of the electronic device 101, the rear view of the electronic device 101 in FIG. 3 is illustrated in a state in which a cover (not illustrate) is removed.

Referring to FIGS. 3 and 4, the electronic device 101 may include a housing 310 and the sliding plate 320. The electronic device 101 may include a camera module 180 on the rear surface 611.

According to an embodiment of the disclosure, the housing 310 is rectangular (e.g., rectangular and/or square) and may include a first side surface 301, a second side surface 302, a third side surface 303, and a fourth side surface 304. The housing 310 may have a rectangular shape surrounded by the first side surface 301, the second side surface 302, the third side surface 303, and the fourth side surface 304. The first side surface 301 and the second side surface 302 may be substantially parallel to each other, and the third side surface 303 and the fourth side surface 304 may be substantially parallel to each other. The first side surface 301 and the third side surface 303 may be orthogonal to each other.

According to an embodiment of the disclosure, the first side surface 301, the second side surface 302, the third side surface 303, and/or the fourth side surface 304 may be configured with a metal frame. According to an embodiment of the disclosure, the first side surface 301, the second side surface 302, the third side surface 303, and/or the fourth side surface 304 may include at least two split frames.

According to an embodiment of the disclosure, the first side surface 301 may be disposed in a sliding area where the sliding plate 320 is slid out and/or slid in. In an embodiment of the disclosure, at least a portion of the sliding plate 320 may define at least a portion of one side surface of the electronic device 101. For example, the sliding plate 320 may define one side surface together with at least a portion of the first side surface 301 in the slide-in state.

According to an embodiment of the disclosure, from the state of being slid into the housing 310, the sliding plate 320 may be slid out by moving to a first direction 450.

An antenna circuit 330 may be disposed on at least a portion of the first side surface 301. The first side surface 301 of the housing 310 may include at least two metal frames. In various embodiments of the disclosure, the first side surface 301 of the housing 310 may include at least two split frames.

According to various embodiments of the disclosure, the antenna circuit 330 may include a second printed circuit board 422. In an embodiment of the disclosure, a receptacle for connecting the second printed circuit board 422 to the cable 421 may be disposed. As another example, the antenna circuit 330 may include an element for frequency matching, such as a capacitor, an inductor, or a switch. The second printed circuit board 422 may be electrically connected to a first frame 401. As another example, the antenna circuit 330 may be omitted and the cable 421 may be electrically connected to the first frame 401 with a connecting member (not illustrated).

For example, the first side surface 301 may include a first frame 401 and a second frame 402. For example, the first frame 401 and the second frame 402 may be slit by a first slit structure 420. The first slit structure 420 may be filled with an insulating material, such as a polymer.

In various embodiments of the disclosure, at least a portion of the first frame 401 and/or the second frame 402 may operate as a radiator of an antenna. For example, at least a portion of the first frame 401 may be electrically connected to a first printed circuit board 410 (e.g., a main PCB). The first printed circuit board 410 may include a processor 120 and/or a communication module 190 disposed thereon.

In various embodiments of the disclosure, the first frame 401 may be electrically connected to the second printed circuit board 422 (e.g., a sub-PCB) and may be electrically connected to the first printed circuit board 410 via a cable 421 (e.g., a coaxial cable) electrically connected to the second printed circuit board 422. The second printed circuit board 422 may be, for example, a rigid PCB.

In various embodiments of the disclosure, the sliding plate 320 may include a second slit structure 430 in an area corresponding to the first slit structure 420 included in the first side surface 301. In an embodiment of the disclosure, at least a portion of the sliding plate 320 overlapping the first side surface 301 may be made of a metal material, a conductive material, or substantially the same material as the first side surface 301.

In various embodiments of the disclosure, the first frame 401 and/or the second frame 402 may be made of a metal material or a conductive material. In the slide-in state of the electronic device 101, the housing 310 and the sliding plate 320 may be at least partially in contact with each other. For example, due to the sliding plate 320, the electronic device 101, in which at least a portion of the first frame 401 and/or the second frame 402 operates as an antenna radiator, may be degraded in radiation efficiency when transmitting and/or receiving a communication signal via the first frame 401 and/or the second frame 402. The second slit structure 430 includes a structure corresponding to the first slit structure 420 of the split first frame 401 and/or the second frame 402. Thus, when the electronic device 101 performs communication in the slide-in state, it is possible to reduce radiation efficiency degradation due to the sliding plate 320. The first slit structure 420 may include an insulating material. The second slit structure 430 may include an insulating material.

Figure 5:
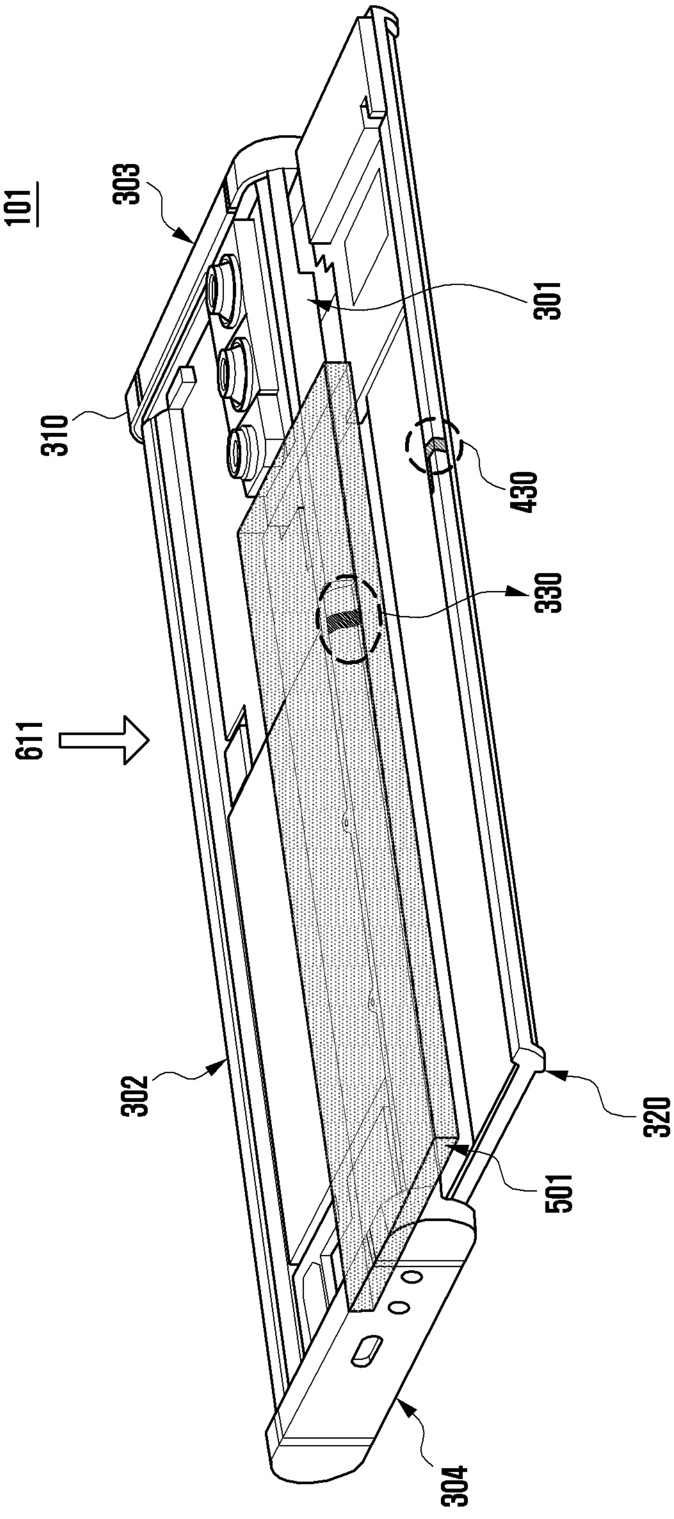
FIG. 5 is a view illustrating a cavity antenna in an electronic device in a slide-out state according to an embodiment of the disclosure.

FIG. 5 is a view illustrating a cavity in an electronic device in a slide-out state according to an embodiment of the disclosure.

Referring to FIG. 5, the electronic device 101 may include a cavity 501 between the housing 310 and the sliding plate 320. In various embodiments of the disclosure, the housing 310 may be the main body of the electronic device 101. The sliding plate 320 may be slid out or slid in based on the housing 310 of the electronic device 101. When the sliding plate 320 is slid in, the housing 310 may include an area and/or a structure corresponding to at least a portion of the structure of the sliding plate 320.

In various embodiments of the disclosure, when the sliding plate 320 is slid out of the housing 310, the cavity 501 may be provided in the space between the housing 310 and the sliding plate 320. The cavity 501 may include an area and/or a structure corresponding to at least a portion of the structure of the sliding plate 320 of the housing 310.

In various embodiments of the disclosure, an empty space may be provided between the housing 310 and the sliding plate 320. For example, between the housing 310 and the sliding plate 320, at least a portion of the housing 310 may include a stair shape. For example, the surface (the first surface) of the housing 310 on which a cover (not illustrated) and/or the camera module 180 are disposed may be configured in a non-stepped flat shape, and the surface (the second surface) on which the display module 160 is disposed may have a stepped stair shape.

In various embodiments of the disclosure, the housing 310 may have a shape in which the first side surface 301, the second side surface 302, the third side surface 303, and the fourth side surface 304 surround a space defined by separating the surface (the first surface) on which the cover (not illustrated) and/or the camera module 180 are disposed and the surface (the second surface) on which the display module 160 is disposed. In various embodiments of the disclosure, the housing 310 may have a shape in which the second side surface 302, the third side surface 303, and the fourth side surface 304 surround a space defined by separating the surface (the first surface) on which the cover (not illustrated) and/or the camera module 180 are disposed and the surface (the second surface) on which the display module 160 is disposed and the first side surface 301 is removed.

The first side surface 301 of the stair shape included in the surface (the second surface) of the housing 310 on which the display module 160 is disposed may have a length smaller than that of the second side surface 302.

At least a portion of the cavity 501 between the housing 310 and the sliding plate 320 may be open. In an embodiment of the disclosure, the cavity 501 may be provided by using a space between the surface (the third surface) provided in the area where the thickness of the housing 310 is smaller than the thickness of the other area of the housing 310 due to the step in the housing 310 and the surface (the fourth surface) where the slid sliding e plate 320 faces the housing 310.

In various embodiments of the disclosure, the cavity 501 may be provided by a space between the surface (the fifth surface) provided in the area where the thickness of the sliding plate 320 is smaller than the thickness of the other area of the sliding plate 320 due to the step in the sliding plate 320 and the surface (the sixth surface) where the housing 310 faces the sliding plate 320.

In various embodiments of the disclosure, in the cavity 501, the space between the surface (the third surface) provided in the area where the thickness of the housing 310 is smaller than the thickness of the other area of the housing 310 due to the step in the housing 310 and the surface (the fourth surface) where the sliding plate 320 faces the housing 310 may be surrounded by at least a portion of the third side surface 303 and at least a portion of the fourth side surface 304 and surrounded by a fifth side surface 305 provided due to the step in the housing 310. The fifth side surface 305 may be parallel to the second side surface 302. The fifth side surface 305 may have a height corresponding to a value obtained by subtracting the length T2 of the first side surface 301 from the length T1 of the second side surface 302.

In various embodiments of the disclosure, the cavity 501 may have a shape having an opening surrounded by the surface (the third surface) provided in the area where the thickness of the housing 310 is smaller than the thickness of the other area of the housing 310, the surface (the fourth surface) where the sliding plate 320 faces the housing 310, at least a portion of the third side surface 303, at least a portion of the fourth side surface 304, and the fifth side surface 305. For example, when the electronic device 101 is slid out, the cavity 501 may be open with respect to the surface on which the sliding plate 320 slides.

According to various embodiments of the disclosure, an antenna using the first frame 401 and/or the second frame 402 as a radiator may operate as a cavity antenna by using the cavity 501 at the time of slide-out. For example, an antenna using the first frame 401 and/or the second frame 402 as a radiator may operate as a power feeder, and the cavity 501 may operate as an antenna radiator.

Figure 6A:
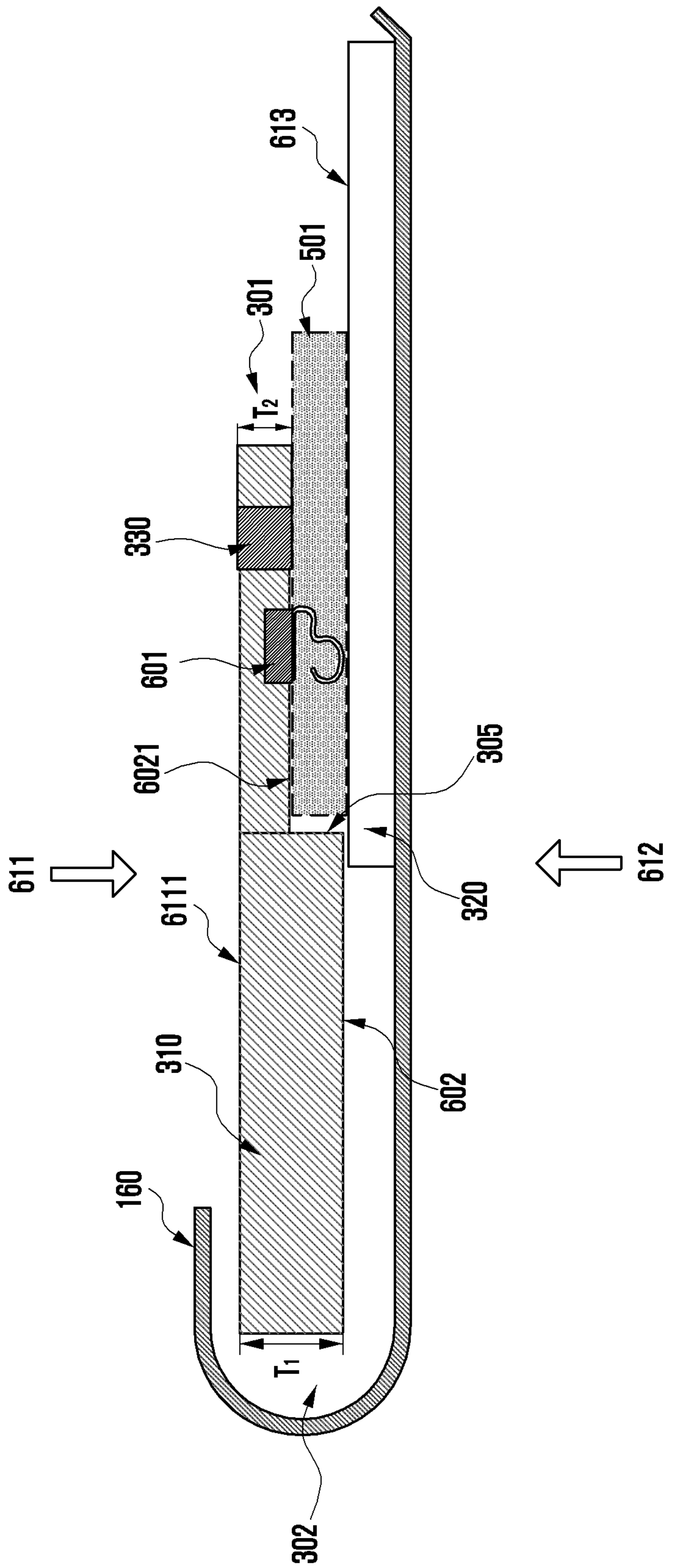
FIG. 6A is a cross-sectional view of an electronic device including a cavity antenna including a contact according to an embodiment of the disclosure.

FIG. 6A is a cross-sectional view of an electronic device including a cavity including a contact according to an embodiment of the disclosure.

Figure 6B:
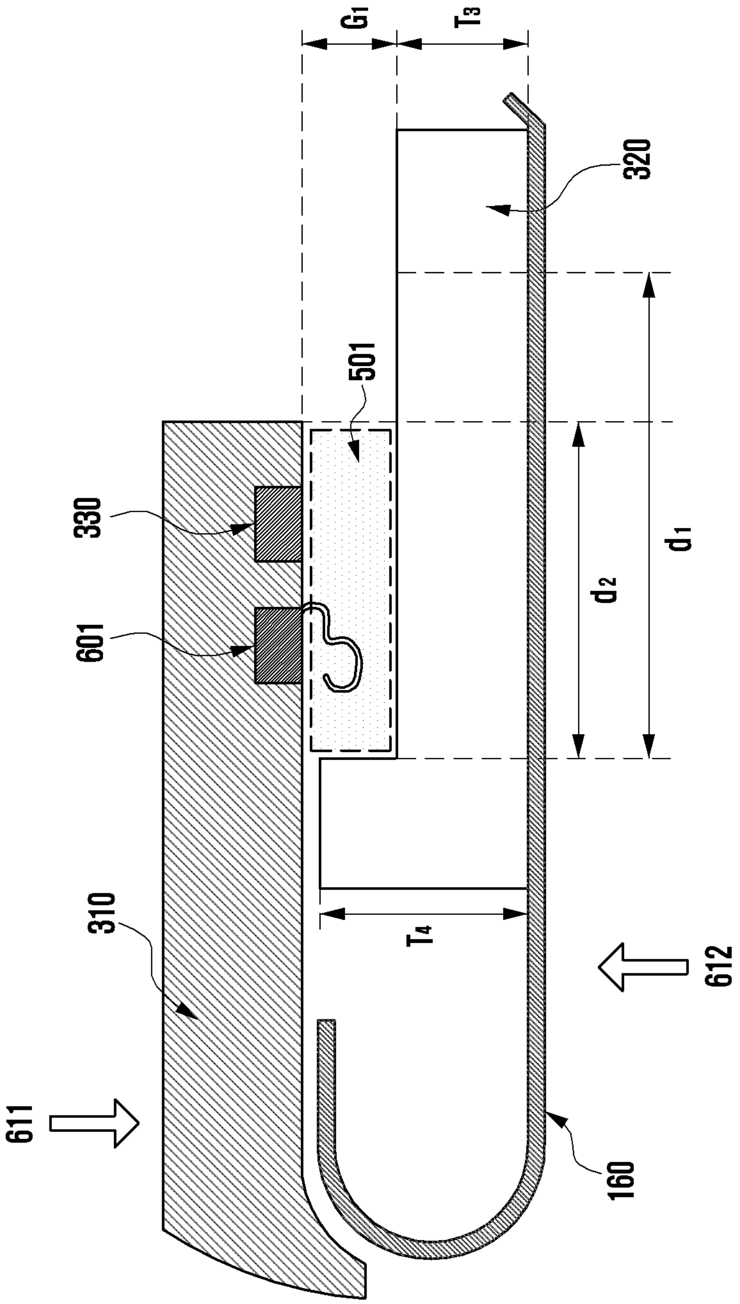
FIG. 6B is a cross-sectional view of an electronic device including a cavity antenna including a contact according to an embodiment of the disclosure.

FIG. 6B is a cross-sectional view of an electronic device including a cavity including a contact according to an embodiment of the disclosure.

Figure 7:
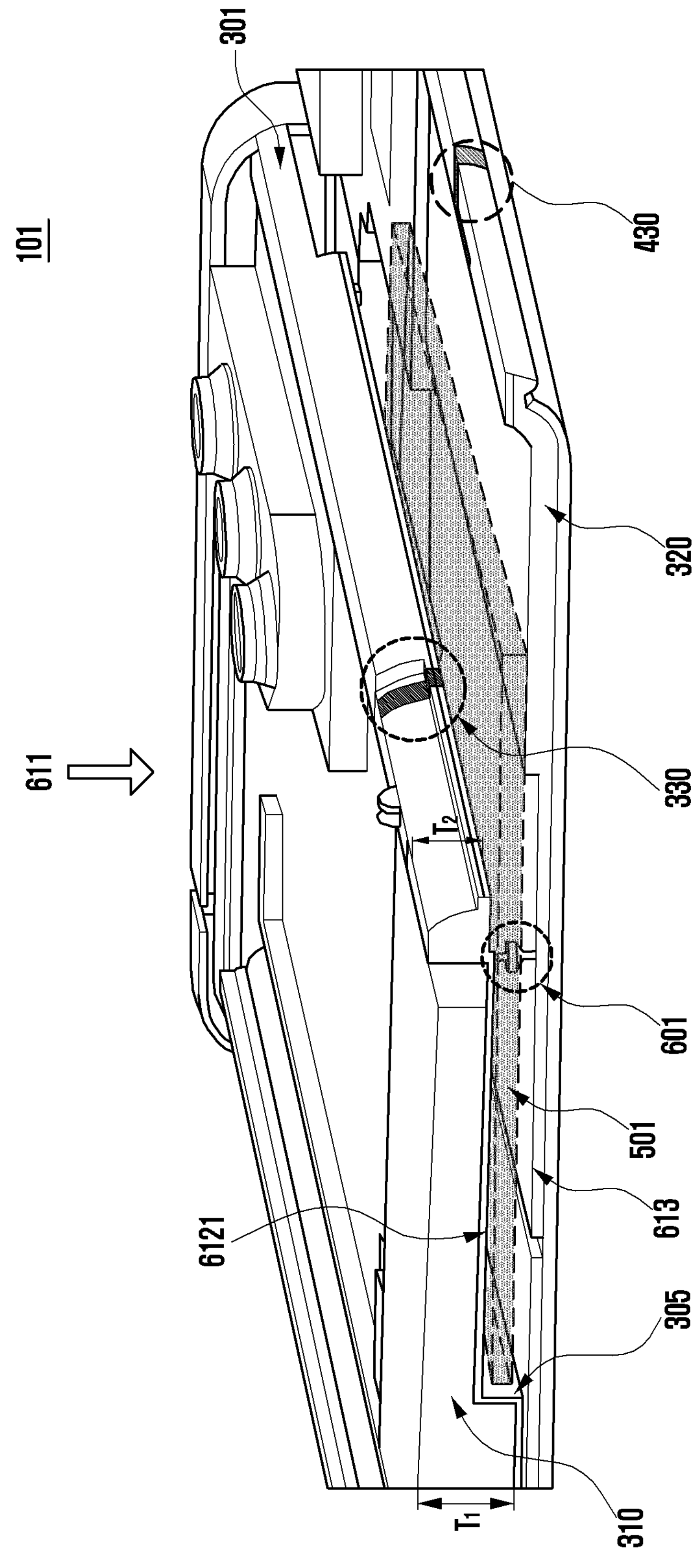
FIG. 7 is a perspective view of an electronic device including a cavity antenna including a contact according to an embodiment of the disclosure.

FIG. 7 is a perspective view of an electronic device including a cavity including a contact according to an embodiment of the disclosure.

Referring to FIGS. 6A and 7, in order to define an empty space between the housing 310 and the sliding plate 320, at least a portion of the housing 310 may include a stair shape. The surface (a first surface 6111) of the housing 310 on which a cover (not illustrated) and/or the camera module 180 are disposed may be configured in a non-stepped flat shape, and the surface (a second surface 602) on which the display module 160 is disposed may have a stepped stair shape.

The electronic device 101 may include a cavity 501 in the space between the housing 310 and the sliding plate 320. Resonance corresponding to a communication frequency may be formed by the length of the major axis and the length of the minor axis of the space between the housing 310 and the sliding plate 320.

According to various embodiments of the disclosure, the contact 601 may be disposed on the surface (a third surface 6021) provided in the area where the thickness of the housing 310 is smaller than that of the other area of the housings 310. In various embodiments of the disclosure, the contact 601 may be included on the surface (a fourth surface 613) of the sliding plate 320 where the sliding plate 320 faces the housing 310. The contact 601 may electrically connect the housing 310 to the sliding plate 320. For example, at least a portion of the sliding plate 320 may serve as a ground for at least a portion of the first frame 401 and/or the second frame 402 used as an antenna radiator.

The housing 310 may include the antenna circuit 330 at least in a portion thereof. An antenna including the antenna circuit 330 of the electronic device 101 may operate as a cavity antenna by using the cavity 501.

According to various embodiments of the disclosure, the contact 601 may perform an impedance (load) matching operation between the housing 310 and the sliding plate 320. The contact 601 may include a load and/or impedance. For example, the contact 601 may include a capacitor and/or an inductor. The contact 601 may change and/or adjust a resonance frequency band of the cavity 501.

Referring to FIG. 6B, in order to provide an empty space between the housing 310 and the sliding plate 320, at least a portion of the sliding plate 320 may include a stair shape and/or a recess. For example, the housing 310 may have a substantially flat shape non-stepped in the front surface 612 direction and the rear surface 611 direction, and the sliding plate 320 may include a stepped stair shape.

According to various embodiments of the disclosure, the sliding plate 320 may define a third thickness T3 in at least some area of the surface facing the housing 310. The sliding plate 320 may define a third thickness T3 and a fourth length T4 in at least some area, providing a step. The fourth thickness T4 may be greater than the third thickness T3. The sliding plate 320 may define the third thickness T3 in the area d1 where the side plate 320 faces the housing 310.

According to various embodiments of the disclosure, when viewed from above the front surface 612 in the open state and the closed state, the area of the sliding plate 320 having the fourth thickness T4 may overlap the housing 310.

According to various embodiments of the disclosure, at least a portion of the area of the sliding plate 320 having the third thickness T3 may be spaced apart from the housing 310 by a predetermined distance G1 to define a cavity 501 together with the housing 310.

According to various embodiments of the disclosure, the housing 310 may include the antenna circuit 330 in at least a portion thereof. An antenna including the antenna circuit 330 of the electronic device 101 may operate as a cavity antenna by using the cavity 501.

According to various embodiments of the disclosure, the surface of the sliding plate 320 on which the display module 160 is disposed may be configured as a flat surface.

According to various embodiments of the disclosure, the electronic device 101 may include a cavity 501 in the space between the housing 310 and the sliding plate 320. Resonance corresponding to a communication frequency may be formed by the length of the major axis and the length of the minor axis of the cavity 501 between the housing 310 and the sliding plate 320.

According to various embodiments of the disclosure, the contact 601 may electrically connect the housing 310 to the sliding plate 320 in the area d2 where the housing 310 and the sliding plate 320 overlap each other. For example, at least a portion of the sliding plate 320 may serve as a ground for at least a portion of the first frame 401 and/or the second frame 402 used as an antenna radiator.

According to various embodiments of the disclosure, the contact 601 may perform an impedance (load) matching operation between the housing 310 and the sliding plate 320. For example, the contact 601 may include a capacitor and/or an inductor. The contact 601 may change and/or adjust a resonance frequency band of the cavity 501.

Figure 8:
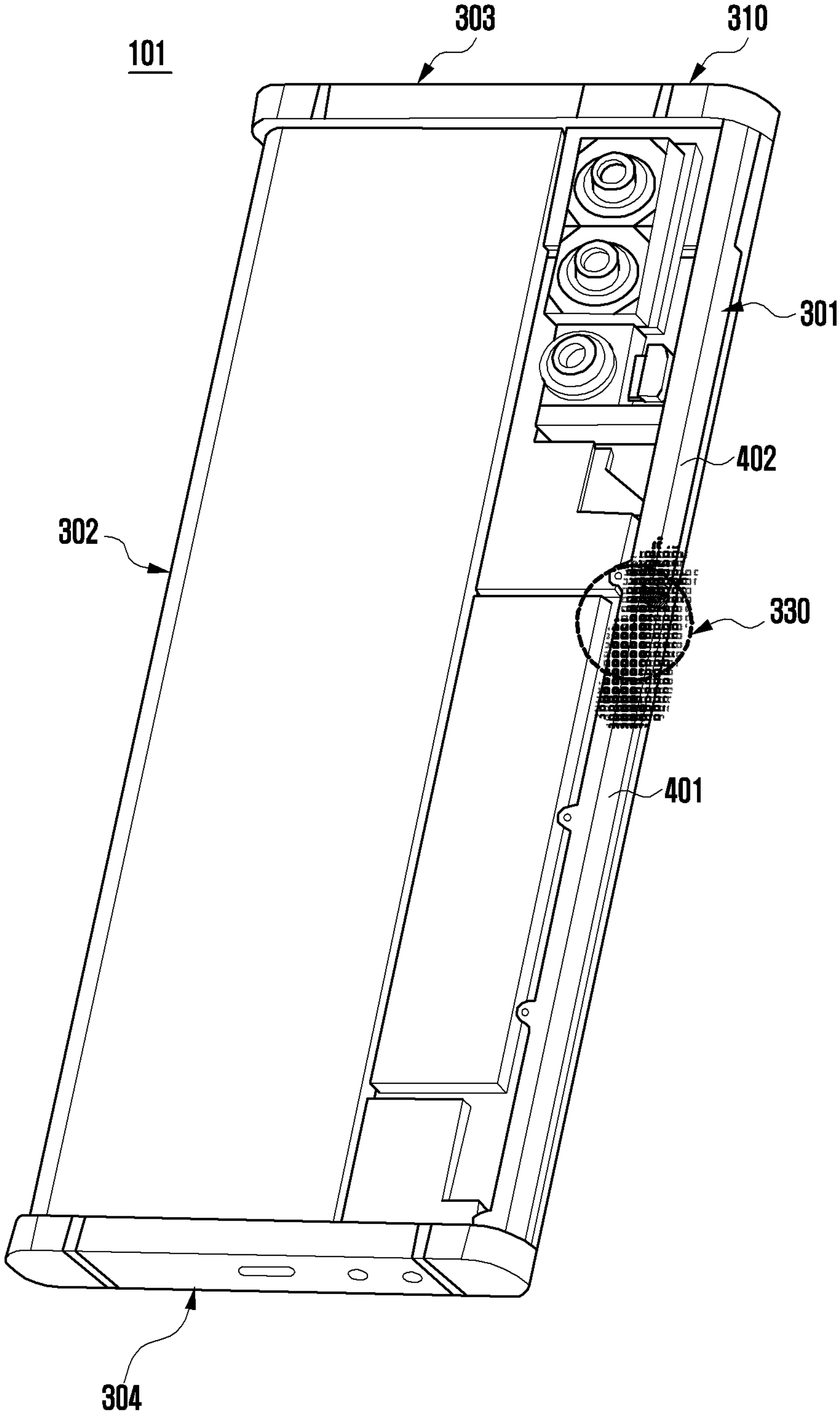
FIG. 8 is a view illustrating an electric field at a resonance frequency in a slide-in state of an electronic device according to an embodiment of the disclosure.

FIG. 8 is a view illustrating an electric field at a resonance frequency in a slide-in state of an electronic device according to an embodiment of the disclosure.

Figure 9:
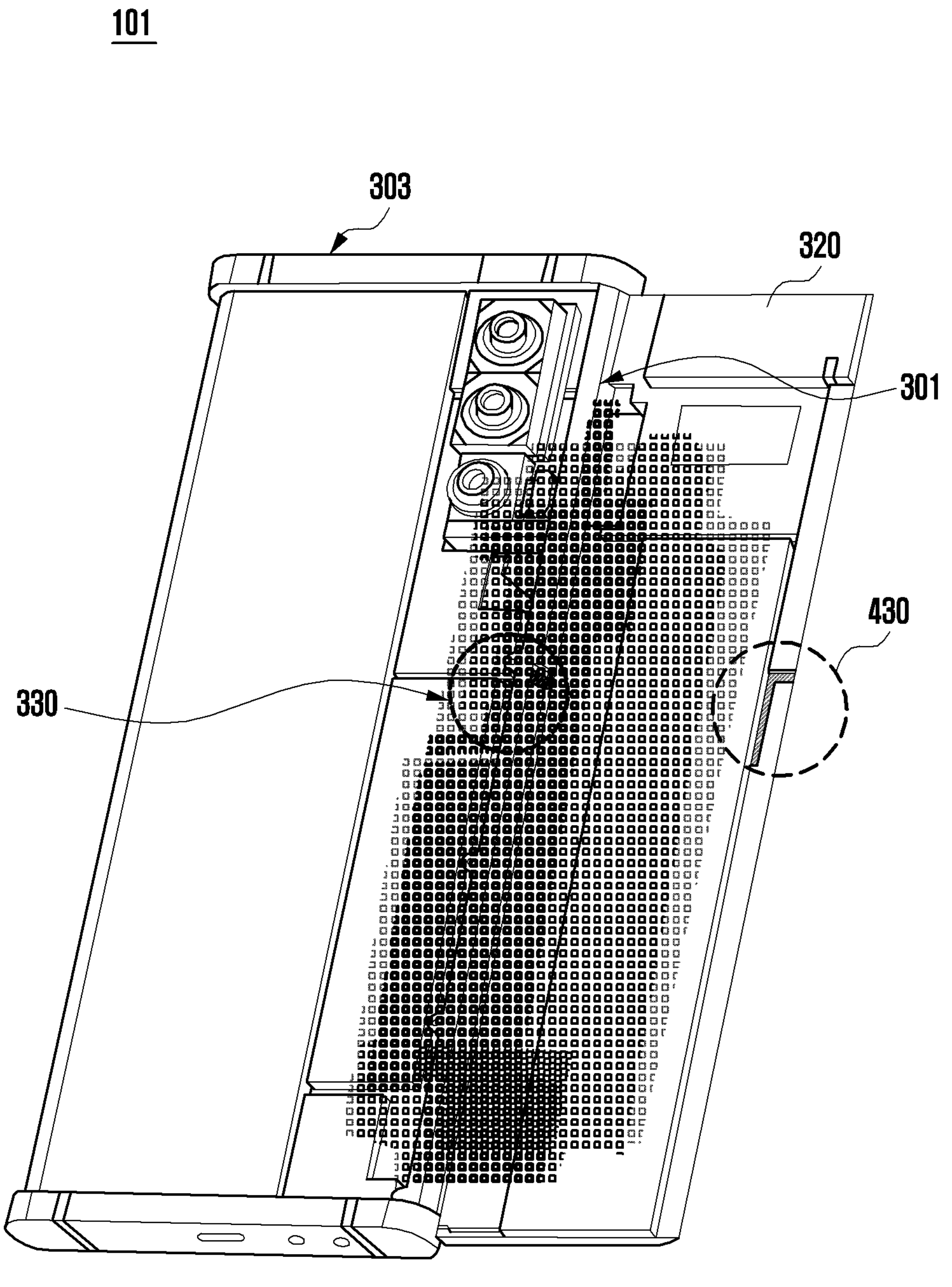
FIG. 9 is a view illustrating an electric field at a resonance frequency in a slide-out state of an electronic device according to an embodiment of the disclosure.

FIG. 9 is a view illustrating an electric field at a resonance frequency in a slide-out state of an electronic device according to an embodiment of the disclosure.

Referring to FIG. 8, in the slide-in state of the electronic device 101, the first slit structure 420 of the housing 310 and the second slit structure 430 of the sliding plate 320 in the electronic device 101 may correspond to each other. The electronic device 101 may perform communication by using an antenna that uses at least a portion of the first frame 401 and/or the second frame 402 as an antenna radiator. When power is fed to the first frame 401 via the antenna circuit 330, an electric field may be formed as illustrated in FIG. 8.

Referring to FIG. 9, in the slide-out state of the electronic device 101, the antenna including the antenna circuit 330 of the electronic device 101 may operate as a cavity antenna. In this case, the electronic device 101 may include a cavity 501 in the space between the housing 310 and the sliding plate 320. In an embodiment of the disclosure, since dielectrics other than air do not exist in the space between the housing 310 and the sliding plate 320, it is possible to reduce dielectric loss, which accounts for a large portion of antenna radiation loss. As another example, when the space between the housing 310 and the sliding plate 320 can be filled with a dielectric material, the resonance frequency may be changed in that case.

Figure 10:
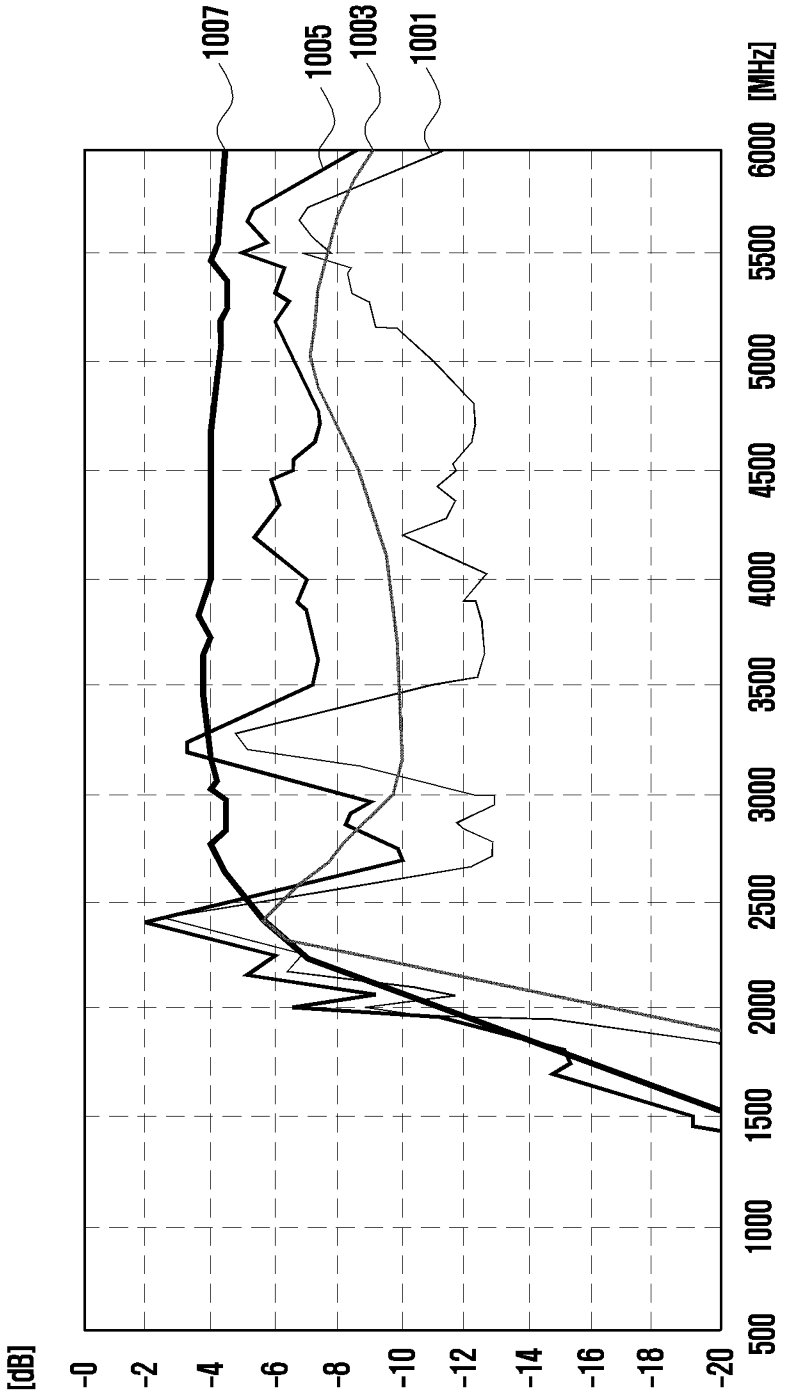
FIG. 10 is a graph showing radiation efficiency of an electronic device 101 including a cavity antenna according to an embodiment of the disclosure.

FIG. 10 is a graph illustrating radiation efficiency of an electronic device including a cavity according to an embodiment of the disclosure.

Referring to FIG. 10, the x-axis represents frequency (unit: megahertz (MHz)), and the y-axis represents radiation efficiency (unit: dB).

1001 represents the total antenna efficiency in the slide-out state of the electronic device 101 using the cavity 501, and 1003 represents the total antenna efficiency in the slide-in state of the electronic device 101 including the cavity 501. 1005 represents the radiation efficiency in the slide-out state of the electronic device 101 using the cavity 501, and 1007 represents the radiation efficiency in the slide-in state of the electronic device 101 including the cavity 501.

Referring to FIG. 10, in the electronic device 101 including the antenna using the cavity 501, interference by neighboring conductive components is reduced due to the effect of increasing the resonance area of the antenna and the cavity mode. As a result, the radiation efficiency and/or total antenna efficiency in the slide-out state may be equal to or improved from the radiation efficiency and/or total antenna efficiency in the slide-in state.

Figure 11:
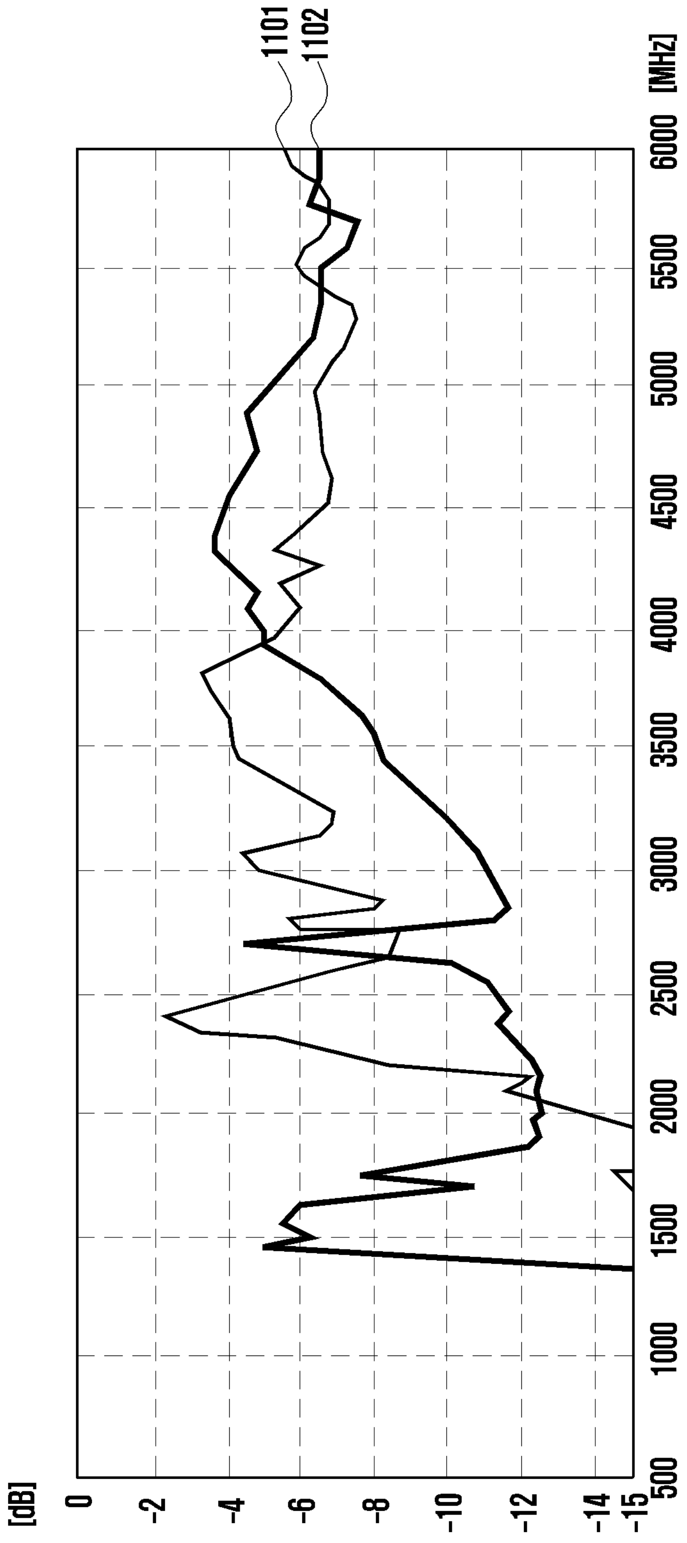
FIG. 11 is a graph showing radiation efficiency of an electronic device including a cavity antenna including a contact according to an embodiment of the disclosure.

FIG. 11 is a graph illustrating radiation efficiency of an electronic device including an antenna using a cavity including a contact according to an embodiment of the disclosure.

Referring to FIG. 11, the x-axis of the graph of FIG. 11 represents frequency (unit: MHz), and the y-axis represents radiation efficiency (unit: dB).

1101 may represent the radiation efficiency of the electronic device 101 including the antenna using the cavity 501 when the contact 601 includes a capacitor or an inductor, and 1102 may represent radiation efficiency of the electronic device 101 including the cavity 501 when the contact 601 does not include a capacitor or an inductor.

According to an embodiment of the disclosure, the contact 601 may adjust or change the resonance frequency of the antenna using the cavity 501 in the electronic device 101. For example, when a capacitor or an inductor is included in the contact 601, the resonance frequency band of the antenna using the cavity 501 may be changed.

Referring to FIG. 11, when the contact 601 includes a 2.5 pF capacitor, the resonance frequency of 1102 may be changed to the resonance frequency band of 1101.

Figure 12A:
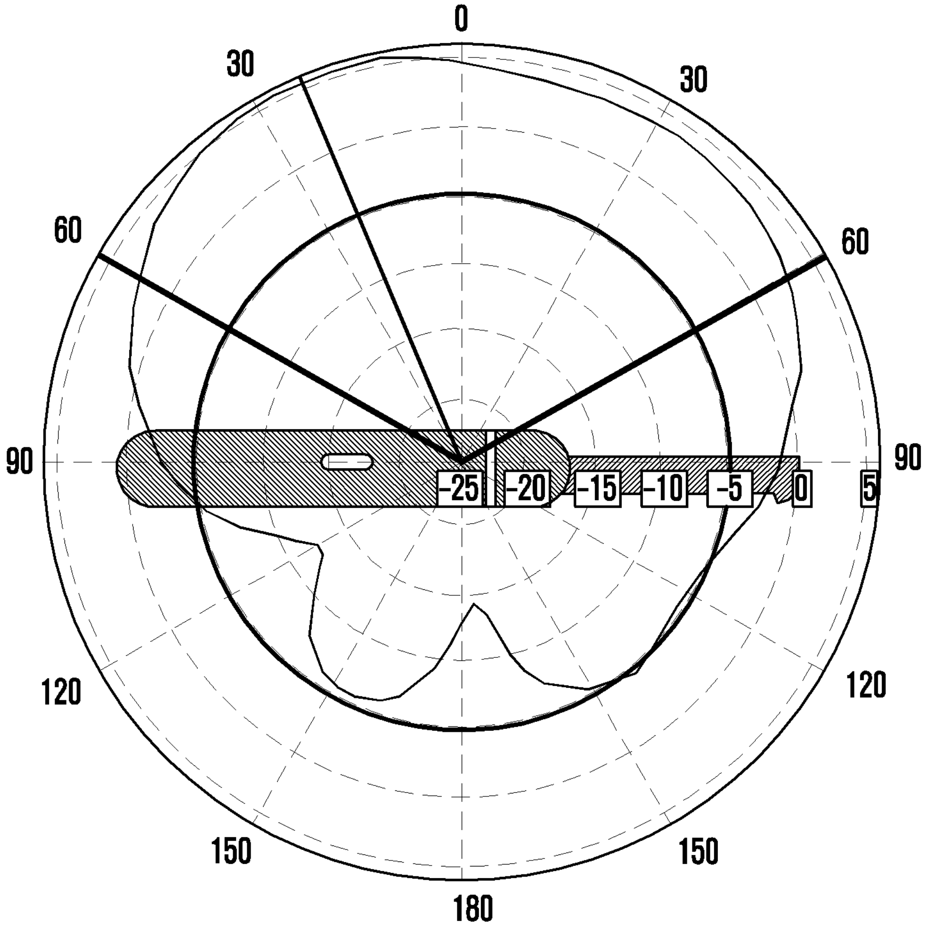
FIG. 12A illustrates a two-dimensional (2D) gain pattern in a predetermined frequency band of an electronic device including a cavity antenna according to an embodiment of the disclosure.

FIG. 12A illustrates a 2D gain pattern in a predetermined frequency band of an electronic device including an antenna using a cavity according to an embodiment of the disclosure.

Figure 12B:
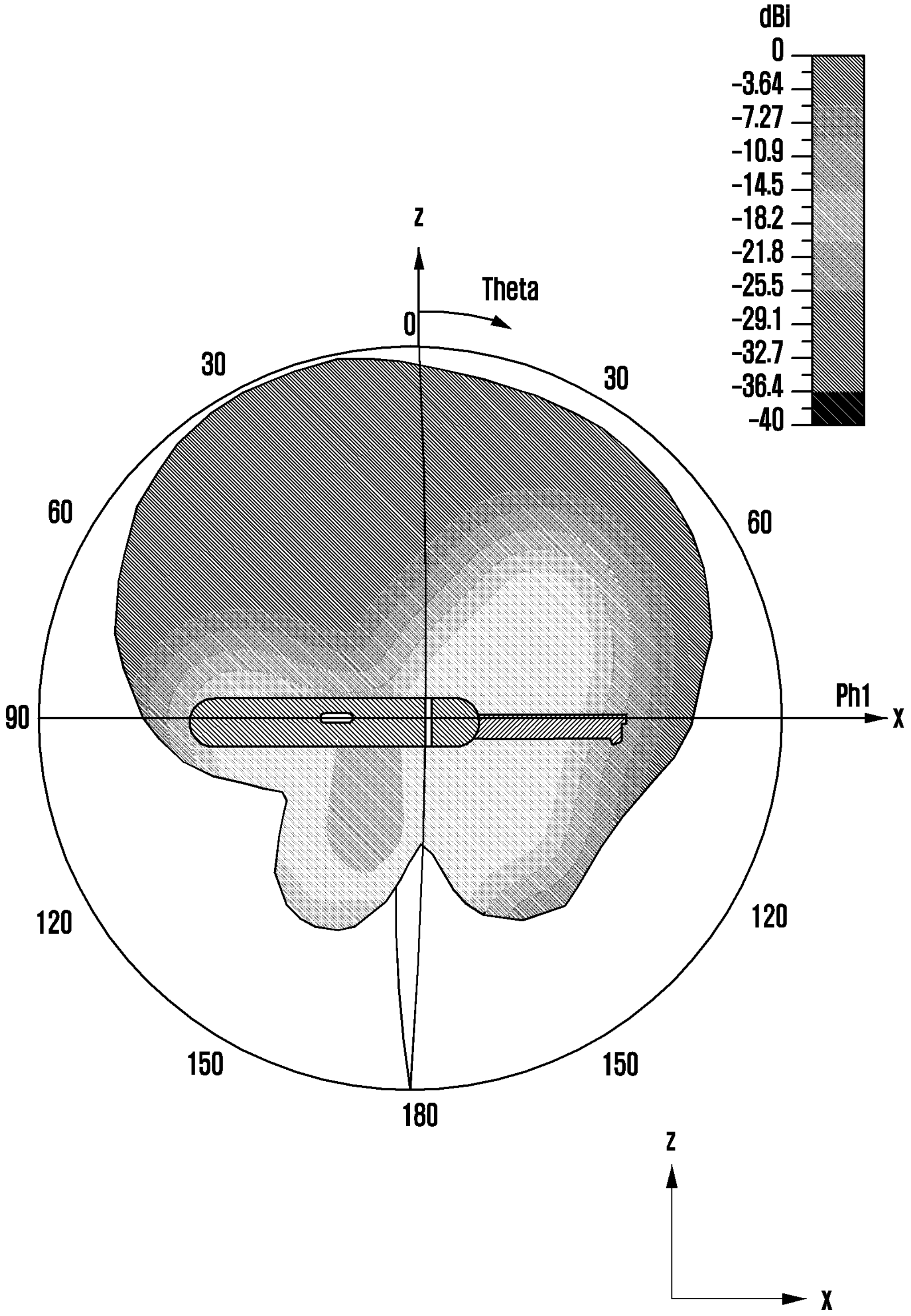
FIG. 12B illustrates a three-dimensional (3D) gain pattern in a predetermined frequency band of an electronic device including a cavity antenna according to an embodiment of the disclosure.

FIG. 12B illustrates a 3D gain pattern in a predetermined frequency band of an electronic device including an antenna using a cavity according to an embodiment of the disclosure.

In an embodiment of the disclosure, the resonance frequency band of the antenna using the cavity 501 may be about 2.4 gigahertz (GHz).

Referring to FIGS. 12A and 12B, the electronic device 101 may execute radiation toward the rear surface 611 and the front surface 612 of the electronic device 101 in the 2.4 GHz band.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment of the disclosure, the "module" may be implemented in the form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each element (e.g., a module or a program) of the above-described elements may include a single entity or multiple entities. According to various embodiments of the disclosure, one or more of the above-described elements may be omitted, or one or more other elements may be added. Alternatively or additionally, a plurality of elements (e.g., modules or programs) may be integrated into a single element. In such a case, according to various embodiments of the disclosure, the integrated element may still perform one or more functions of each of the plurality of elements in the same or similar manner as they are performed by a corresponding one of the plurality of elements before the integration. According to various embodiments of the disclosure, operations performed by the module, the program, or another element may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a housing; and a sliding plate configured to slide in and slide out relative to the housing, wherein the housing comprises:

an antenna circuit disposed on a side surface of the housing corresponding to a sliding-side area of the sliding plate, and a contact electrically interconnecting the housing and the sliding plate, wherein the antenna circuit further comprises at least one frame disposed on the side surface as a radiator, wherein the side surface comprises a first slit structure, wherein the housing and the sliding plate define a first space when the sliding plate is in a slide-out state, and wherein the first space, the contact, the first slit structure, and the antenna circuit configure a cavity antenna.

2. The electronic device of claim 1, wherein the housing comprises:

a non-stepped first surface; and a stepped second surface, and wherein the side surface surrounds a second space between the non-stepped first surface and the stepped second surface.

3. The electronic device of claim 2, wherein the side surface comprises a first side surface, a second side surface, a third side surface, and a fourth side surface surrounding the first space in a substantially rectangular shape.

4. The electronic device of claim 3, wherein the first side surface is disposed on the side surface corresponding to the sliding-side area of the sliding plate of the sliding plate.

5. The electronic device of claim 4, wherein the first side surface comprises:

at least two frames, wherein the first slit structure is formed between the at least two frames, and wherein the at least two frames are made of a conductive material.

6. The electronic device of claim 5, wherein the sliding plate comprises a second slit structure corresponding to the first slit structure when the sliding plate is in a slide-in state.

7. The electronic device of claim 4, wherein the second side surface is parallel to the first side surface, and wherein the second side surface, which surrounds the non-stepped first surface and the stepped second surface, has a height greater than a height of the first side surface, which surrounds the non-stepped first surface and the stepped second surface.

8. The electronic device of claim 7, further comprising:

a fifth side surface, which surrounds the non-stepped first surface and the stepped second surface, wherein the fifth side surface is parallel to the second side surface and has a length obtained by subtracting the height of the first side surface from the height of the second side surface.

9. The electronic device of claim 8, wherein the first space comprises:

a surface on which the sliding plate faces the housing in a state in which the sliding plate is slid out;

at least a portion of the stepped second surface; and an opening surrounded by the fifth side surface.

10. The electronic device of claim 5, wherein the antenna circuit is electrically connected to a main printed circuit board.

11. The electronic device of claim 10, wherein the at least two frames comprise an antenna pattern.

12. The electronic device of claim 11, further comprising:

a cable electrically interconnecting the at least two frames and the main printed circuit board; and a sub-printed circuit board electrically connected to the cable and electrically connected to the at least two frames.

13. The electronic device of claim 12, wherein the sub-printed circuit board is included in the at least two frames and/or the first slit structure.

14. The electronic device of claim 1, wherein the contact is disposed in the first space and comprised in the housing or the sliding plate, the contact being configured to adjust a resonance frequency band of the cavity antenna and to perform an impedance matching operation of the housing or the sliding plate.

15. The electronic device of claim 1, wherein the sliding plate comprises:

a non-stepped third surface;

a stepped fourth surface; and a side surface surrounding a third space between the non-stepped third surface and the stepped fourth surface.

16. The electronic device of claim 1, wherein the cavity antenna forms a resonance corresponding to an operating frequency based on a length of a major axis of the first space, a length of a minor axis of the first space and a dielectric included in the first space.

* * * * *